US006177121B1

(12) United States Patent
Elkin et al.

(10) Patent No.: US 6,177,121 B1
(45) Date of Patent: Jan. 23, 2001

(54) COMPOSITION AND METHOD FOR PRODUCING LOW CHOLESTEROL EGGS

(75) Inventors: Robert G. Elkin, State College, PA (US); Zhihong Yan, Chesterfield, MO (US)

(73) Assignee: Purdue Research Foundation, West Lafayette, IN (US)

( * ) Notice: Under 35 U.S.C. 154(b), the term of this patent shall be extended for 0 days.

(21) Appl. No.: 09/162,522

(22) Filed: Sep. 29, 1998

Related U.S. Application Data

(60) Provisional application No. 60/060,286, filed on Sep. 29, 1997.

(51) Int. Cl.$^7$ .................................................. A23L 1/32

(52) U.S. Cl. ............................................. 426/614; 426/2

(58) Field of Search ............................... 426/614, 2, 630, 426/635, 636

(56) References Cited

U.S. PATENT DOCUMENTS

| | | |
|---|---|---|
| 3,983,140 | 9/1976 | Endo et al. . |
| 4,049,495 | 9/1977 | Endo et al. . |
| 4,137,322 | 1/1979 | Endo et al. . |
| 4,231,938 | 11/1980 | Monaghan et al. . |
| 4,346,227 | 8/1982 | Terahara et al. . |
| 4,432,996 | 2/1984 | Gullo et al. . |
| 4,444,784 | 4/1984 | Hoffman et al. . |
| 4,603,142 | 7/1986 | Burger et al. ................. 514/456 |
| 4,647,576 | 3/1987 | Hoefle et al. . |
| 4,681,893 | 7/1987 | Roth . |
| 5,273,995 | 12/1993 | Roth . |

OTHER PUBLICATIONS

Krause, R. Brian and Newton, Roger S., "Lipid–lowering activity of atorvastatin and lovastatin in rodent species: triglyceride–lowering in rate correlates with efficacy in LDL animal models," *Atherosclerosis* 117 (1995) 237–244.

Conde, Karin; et al., "Hypocholesterolemic actions of atorvastatin are associated with alterations on hepatic cholesterol metabolism and lipoprotein composition in the guinea pig", *Journal of Lipid Research*, vol. 37, 1996.

Griffin, H.D., "Manipulation of egg yolk cholesterol: a physiologist's view," *World's Poultry Science Journal*, vol. 48, Jul. 1992.

Luhman, Cindie, M.; Miller, Bryan G. and Beitz, Donald C., "Research Note: The Effect of Feeding Lovastatin and Colestipol on Production and Cholesterol Content of Eggs", *1990 Poultry Science* 69:852–855.

Elkin, Robert G. and Rogler, John C., "Reduction of the Cholesterol Content of Eggs by theOral Administration of Lovastatin to Laying Hens", *Journal of Agricultural and Food Chemistry*, 1990, 38.

Elkin, Robert G. et al., "Alterationof Egg Yolk Cholesterol Content and Plasma Lipoprotein Profiles following Administration of a Totally Synthetic HMG–CoA Reductase Inhibitor to Laying Hens," *Journal of Agricultural and Food Chemistry*, 1993, 41.

Gotton, Jr., Antonio M.; Smith, Louis C. and Allen, Barbara, *Athero–Sclerosis V*, Springer–Verlag, New York, 1980.

Huggett, Christine D., Buttery, Peter J. and Salter, Andrew M., "Plasma VLDL cholesterol and egg cholesterol are resistant to change inthe laying hen", *Biochemical Society Transactions* (1993) vol. 21, pp. 1475.

Hargis, P. Stewart, "Modifying egg yold cholesterol in the domestic fowl—a review", *World's Poultry Science Journal* vol. 44 (1988).

"Cerivastatin Posters Presented at Scientific Meetings 1997", Bayer, 1997, pp. 1–4.

"Reduction of LDL Cholesterol by 25% to 60% in Patients With Primary Hypercholesterolemia by Atorvastatin, a New HMG–CoA Reductase Inhibitor", Nawrocki et al., Arterioscler. Thromb. Vasc. Biol., 1995, vol. 15, pp. 678–682.

"Efficacy and Safety of New HMG–CoA Reductase Inhibitor, Atorvastatin, in Patients with Hypertriglyceridemia", Bakker–Arkema et al., JAMA, Jan. 10, 1996, vol. 275, No. 2, pp. 128–133.

"Inhibitors of Cholesterol Biosynthesis", Roth et al., Journal of Medicinal Chemistry, 1991, vol. 34, No. 1, pp. 357–366.

"The Discovery and Development of HMG–CoA Reductase Inhibitors", Endo, Journal of Lipid Research, 1992, vol. 33, pp. 1569–1582.

Database Abstract. 102:4947 HCA Low–cholesterol egg production. JP 59029209, Jul. 1984.*

* cited by examiner

*Primary Examiner*—Anthony J. Weier
(74) *Attorney, Agent, or Firm*—Woodard, Emhardt, Naughton, Moriarty & McNett

(57) ABSTRACT

An animal food composition effective in reducing the amount of cholesterol in an egg including an animal food and an HMG-CoA reductase inhibitor, preferably a statin, is described. A method of reducing the amount of cholesterol in an egg by administering to an egg-laying animal an amount of a cholesterol-reducing component effective in reducing the amount of cholesterol in said egg and the eggs produced are also described.

12 Claims, 7 Drawing Sheets

COMPOSITION AND METHOD FOR PRODUCING LOW CHOLESTEROL EGGS

This application claims the benefits of the earlier filed U.S. Provisional Application Serial No. 60/060286, filed Sep. 29, 1997.

FIELD OF THE INVENTION

The present invention relates to an animal food composition effective in reducing the level of cholesterol in an egg and a method of producing low cholesterol eggs. More specifically, the invention relates to an animal food composition including an animal food and a 3-hydroxy-3-methylglutaryl coenzyme A (HMG-CoA) reductase inhibitor. The invention further relates to a method of producing low cholesterol eggs by administering an HMG-CoA reductase inhibitor to an egg-laying animal. The eggs so produced are also described.

BACKGROUND OF THE INVENTION

Coronary heart disease is one of the leading causes of death in the United States. The relationship between elevated plasma cholesterol levels, especially plasma low density lipoprotein (LDL) cholesterol, and an increased risk of contracting coronary heart disease has been well established. In light of this relationship, a dietary cholesterol intake of less than 300 mg/day has been recommended for all Americans (National Institutes of Health Consensus Development Panel, 1985). Foodstuffs containing lowered levels of cholesterol are therefore desired.

Each chicken egg contains about 215 mg cholesterol. Efforts at reducing the level of cholesterol in intact chicken eggs have included genetic selection, use of low fat and high fiber diets, administration of pharmacological agents and various egg selection methods. Many of these methods are tedious and others have not led to large decreases in egg cholesterol. An animal food composition effective in reducing the amount of cholesterol in an egg and a method of producing low cholesterol eggs are therefore needed. The present invention addresses these needs.

SUMMARY OF THE INVENTION

The present invention relates to an animal food composition including an animal food and an HMG-CoA reductase inhibitor. The animal food composition is preferably an oviparous vertebrate food composition. The animal food composition is effective in reducing the amount of cholesterol in an egg. The HMG-CoA reductase inhibitor is preferably a compound having the following formula:

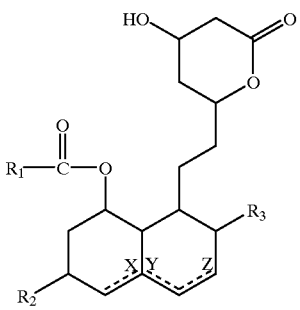

wherein $R_1$ is $C_{3-10}$cycloalkyl; $C_{1-10}$alkyl provided that the $C_{1-10}$alkyl is not 1-methylpropyl if $R_2$ and $R_3$ are both methyl groups; $C_{1-10}CF_3$-substituted alkyl; phenyl; halophenyl; phenyl-$C_{1-3}$ alkyl; substituted phenyl-$C_{1-3}$alkyl in which the substituent is halo, $C_{1-3}$alkyl or $C_{1-3}$alkoxy;

$R_2$ is H, $C_{1-10}$alkyl, or hydroxyl;

$R_3$ is H, $C_{1-10}$alkyl;

the dotted lines at X, Y and Z represent possible double bonds, said double bonds when present being either X and Z in combination or X, Y or Z alone;

or the corresponding dihydroxy acid, a pharmaceutically acceptable salt of said acid, a $C_{1-4}$alkyl ester of said acid, a phenyldimethylamino-substituted-$C_{1-4}$alkyl ester of said acid or an acetylamino-substituted-$C_{1-4}$alkyl ester of said acid.

In yet another embodiment of the present invention, the HMG-CoA reductase inhibitor is a compound of the following formula:

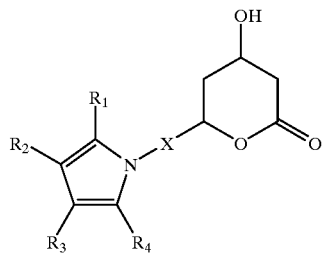

wherein

X is —$CH_2$—, —$CH_2CH_2$—, —$CH_2CH_2CH_2$— or —$CH_2CH(CH_3)$—;

$R_1$ is 1-naphthyl; 2-naphthyl; cyclohexyl; norbornenyl; 2-, 3-, or 4-pyridinyl; 2-, 3- or 4-pyridinyl-N-oxide; 2-, 3- or 4-(N—$C_{1-4}$alkyl) pyridinium halide; phenyl; phenyl substituted with halogen, hydroxyl, trifluoromethyl, $C_{1-4}$alkyl, $C_{1-4}$alkoxy, $C_{2-8}$ alkanoyloxy; $C_{1-8}$alkyl;

$R_2$ and $R_3$ are independently hydrogen; cyano; trifluoromethyl; phenyl; $C_{1-4}$alkyl; $C_{2-8}$ carboalkoxy; $CH_2OR_7$ where $R_7$ is hydrogen, $C_{1-6}$alkanoyl, —$CONHR_8$ where $R_8$ is a $C_{1-6}$ alkyl, phenyl or phenyl substituted with halogen or $C_{1-4}$alkyl; halogen provided that if $R_1$ is 1-methylethyl, $R_4$ is 4-fluorophenyl and either of $R_2$ or $R_3$ is bromine, the other of $R_2$ or $R_3$ is not bromine; or either of $R_2$ or $R_3$ is —$CONR_5R_6$ where $R_5$ and $R_6$ are independently hydrogen; $C_{1-6}$ alkyl; 2-, 3- or 4-pyridinyl; phenyl; phenyl substituted with halogen, cyano, trifluoromethyl or $C_{3-8}$-carboalkoxy; and the other of $R_2$ or $R_3$ is hydrogen; $C_{1-6}$alkyl; cyclopropyl; cyclobutyl; cyclopentyl; cyclohexyl; phenyl; phenyl substituted with halogen, hydroxyl, trifluoromethyl, $C_{1-4}$alkyl, $C_{1-4}$alkoxy, or $C_{2-8}$alkanoyloxy; and $R_4$ is $C_{1-6}$alkyl, cyclopropyl; cyclobutyl; cyclopentyl; cyclohexyl; trifluoromethyl; phenyl; or phenyl substituted with halogen;

or the corresponding dihydroxy acid.

In yet another embodiment of the invention, a method of lowering the amount of cholesterol in an egg is provided that includes administering to an egg-laying animal an effective amount of the above-described compounds. The method is preferably carried out with chickens but may be carried out with any oviparous vertebrate, including turkey, geese, quail, rattites (including ostriches, emus and rheas) turtles and fish.

In a further embodiment of the present invention, an egg produced by the above-method is also described.

DESCRIPTION OF THE PREFERRED EMBODIMENT

Figure 1:
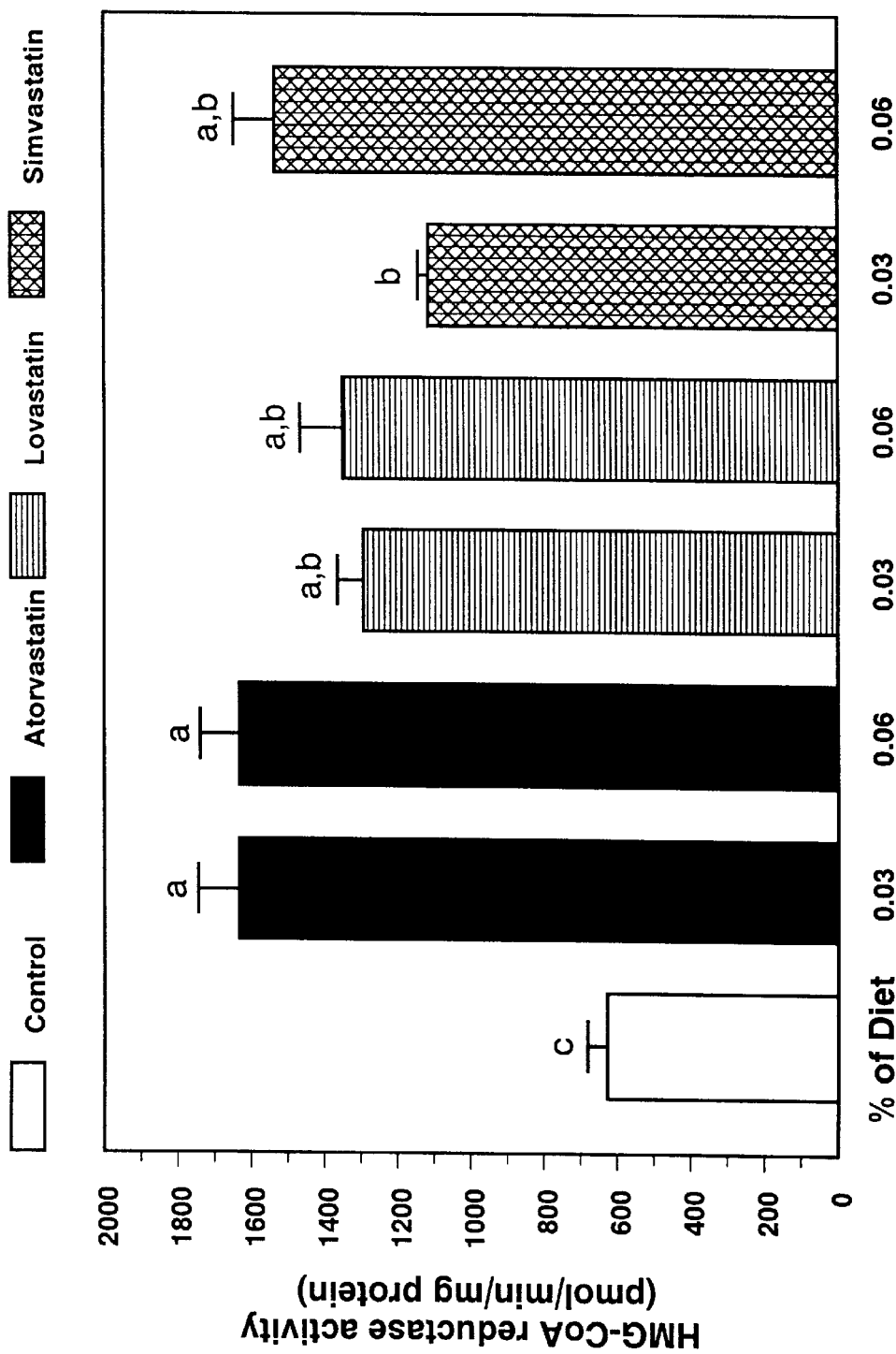
FIG. 1 is a graph showing hepatic microsomal HMG-CoA reductase activity in control (n=10) and statin-treated (n=5) laying hens on day 35 of the study. Values are mean±SD. Bars with similar letters are not significantly different (P>0.05).

For the purposes of promoting an understanding of the principles of the invention, reference will now be made to preferred embodiments and specific language will be used to describe the same. It will nevertheless be understood that no limitation of the scope of the invention is thereby intended, such alterations and further modifications of the invention, and such further applications of the principles of the invention as illustrated herein, being contemplated as would normally occur to one skilled in the art to which the invention relates.

As described above, the present invention relates to an animal food composition effective in reducing the cholesterol content of an egg, a method of reducing the cholesterol content of an egg and an egg having a decreased amount of cholesterol produced by the method. The compounds used in the method are inhibitors of the rate-limiting enzyme in cholesterol biosynthesis, HMG-CoA reductase, and are preferably members of the class of drugs known as statins. The inhibitors are advantageously administered to poultry, especially chickens.

In one aspect of the invention, an animal food composition effective in reducing the amount of cholesterol in an egg includes an animal food and a compound with a substituted polyhydronapthalene nucleus having the following formula (I):

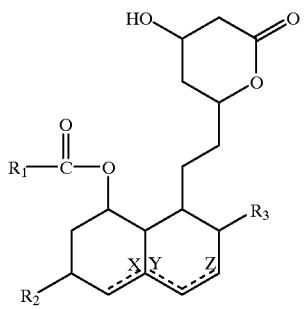

$R_1$ is $C_{3-10}$cycloalkyl; $C_{1-10}$alkyl provided that the $C_{1-10}$alkyl is not 1-methylpropyl if $R_2$ and $R_3$ are both methyl groups; $C_{1-10}CF_3$-substituted alkyl; phenyl, halophenyl; phenyl-$C_{1-3}$ alkyl; substituted phenyl-$C_{1-3}$alkyl in which the substituent is halo, $C_{1-3}$alkyl or $C_{1-3}$alkoxy;

$R_2$ is H, $C_{1-10}$alkyl, or hydroxyl;

$R_3$ is H, $C_{1-10}$alkyl; and the dotted lines at X, Y and Z represent possible double bonds, said double bonds when present being either X and Z in combination or X, Y or Z alone; or the corresponding dihydroxy acid of the formula (II):

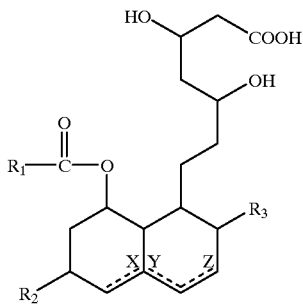

or a pharmaceutically acceptable salt of said acid, a $C_{1-4}$alkyl ester of said acid, a phenyldimethylamino-substituted-$C_{1-4}$alkyl ester of said acid or an acetylamino-substituted-$C_{1-4}$alkyl ester of said acid.

$R_2$ is further preferably a methyl group or a hydroxyl group and $R_1$ is further preferably 1,1-dimethylpropyl. $R_1$ may be 1-methylpropyl unless $R_2$ and $R_3$ are both methyl groups. $R_3$ is advantageously a methyl group. The compound is further preferably a 2,2-dimethylbutyric acid 8-ester with (4R,6R)-6-[2-[1S,2S,6R,8S,8aR)-1,2,6,7,8,8a-hexahydro-8-hydroxy-2,6-dimethyl-1-naphthyl]ethyl] tetrahydro-4-hydroxy-2H-pyran-2-one (simvastatin). Other preferred embodiments are delineated in U.S. Pat. Nos. 3,983,140; 4,049,495; 4,231,938; 4,346,227; 4,432,996; and 4,444,784.

The compounds, including ML-236B (wherein $R_1$ is 1-methylpropyl, $R_2$ is hydrogen and $R_3$ is a methyl group) and its derivatives, may be isolated and purified from fungi as known in the art and as shown in U.S. Pat. Nos. 3,983,140; 4,049,495; 4,231,938; 4,346,227; and 4,432,996 which are hereby incorporated by reference in their entirety. The compounds shown above may also be synthesized by methods known in the art and as described in U.S. Pat. No. 4,444,784 and U.S. patent application Ser. No. 118,050 filed Feb. 4, 1980 which are also hereby incorporated by reference in their entirety.

As used herein, the following terms have the following meanings:

alkyl means a saturated or unsaturated aliphatic hydrocarbon which may be either straight chain or branched and includes methyl, ethyl and structural isomers of propyl, butyl, pentyl, hexyl, heptyl, octyl, nonyl and decyl.

Alkoxy means an alkyl group as defined above attached to an oxygen atom. Carboalkoxy means an alkoxy group as defined above attached through the oxygen atom to a carbonyl group.

Norbornenyl means a group derived by the removal of a hydrogen atom (other than at a bridgehead carbon atom) from bicyclo[2.2.1]hept-2-ene.

Alkanoyloxy means an alkyl group attached to a carbonyl group which is attached to an oxygen atom.

In yet another embodiment of the present invention, the animal food composition includes compounds I and II above having the following configuration (III):

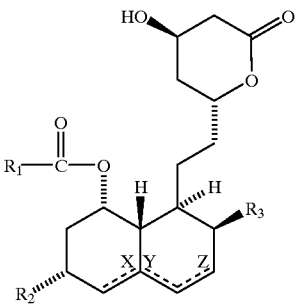

wherein $R_1$, $R_2$ and $R_3$ are as defined for compound I above; or the corresponding dihydroxy acid having the following configuration (IV):

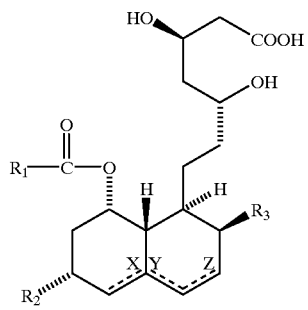

or a pharmaceutically acceptable salt of said diydroxy acid, a $C_{1-4}$alkyl ester of said dihydroxy acid, a phenyldimethylamino-substituted-$C_{1-4}$alkyl ester of said dihydroxy acid or an acetylamino-substituted-$C_{1-4}$alkyl ester of said dihydroxy acid.

In yet another embodiment of the invention, the animal food composition includes a compound having a substituted pyrrole of the following formula (V):

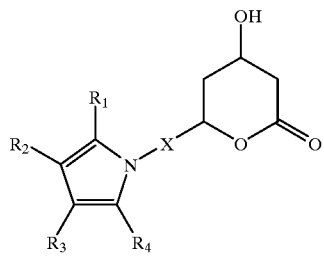

wherein

X is —$CH_2$—, —$CH_2CH_2$—, —$CH_2CH_2CH_2$— or —$CH_2CH(CH_3)$—;

$R_1$ is 1-naphthyl; 2-naphthyl; cyclohexyl; norbornenyl; 2-, 3-, or 4-pyridinyl; 2-, 3- or 4-pyridinyl-N-oxide; 2-, 3- or 4-(N—$C_{1-4}$alkyl) pyridinium halide; phenyl; phenyl substituted with halogen, hydroxyl, trifluoromethyl, $C_{1-4}$ alkyl, $C_{1-4}$ alkoxy, $C_{2-8}$ alkanoyloxy; $C_{1-8}$ alkyl;

$R_2$ and $R_3$ are independently hydrogen; cyano; trifluoromethyl; phenyl; $C_{1-4}$alkyl; $C_{2-8}$ carboalkoxy; $CH_2OR_7$ where $R_7$ is hydrogen; $C_{1-6}$alkanoyl, —$CONHR_8$ where $R_8$ is a $C_{1-6}$ alkyl, phenyl or phenyl substituted with halogen or $C_{1-4}$alkyl; halogen provided that if $R_1$ is 1-methylethyl, $R_4$ is 4-fluorophenyl and either of $R_2$ or $R_3$ is bromine, the other of $R_2$ or $R_3$ is not bromine; or either of $R_2$ and $R_3$ is —$CONR_5R_6$ where $R_5$ and $R_6$ are independently hydrogen; $C_{1-6}$ alkyl; 2-, 3- or 4-pyridinyl; phenyl; phenyl substituted with halogen, cyano, trifluoromethyl or $C_{3-8}$carboalkoxy; and the other of $R_2$ or $R_3$ is hydrogen; $C_{1-6}$alkyl; cyclopropyl; cyclobutyl; cyclopentyl; cyclohexyl; phenyl; or phenyl substituted with halogen, hydroxyl, trifluoromethyl, $C_{1-4}$alkyl, $C_{1-4}$alkoxy, or $C_{2-8}$alkanoyloxy; and $R_4$ is $C_{1-6}$alkyl, cyclopropyl; cyclobutyl; cyclopentyl; cyclohexyl; trifluoromethyl; pheny; or phenyl substituted with halogen;

or the corresponding dihydroxy acid of the formula (VI):

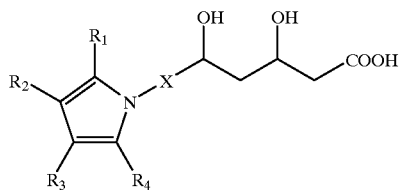

or a pharmaceutically acceptable salt thereof.

X is preferably a methylene (—$CH_2CH_2$—) group. $R_1$ is preferably a $C_{1-3}$alkyl group and is further preferably 1-methylethyl. Furthermore, $R_2$ is preferably —$CONR_5R_6$, $R_5$ is preferably hydrogen and $R_6$ is a preferably a phenyl group. $R_4$ is advantageously a substituted phenyl, preferably 4-fluorophenyl. Moreover, $R_3$ is preferably a phenyl group. $R_2$ and $R_3$ may also both be methylene groups joined together in a ring through 3 or 4 methylene groups or through an oxygen atom. $R_2$ and $R_3$ may also both be carbonyl groups and may be joined together in a ring through a nitrogen atom. The nitrogen atom is further attached to a hydrogen, a $C_{1-4}$ alkyl, or a benzyl group. In yet another aspect of the invention, $R_2$ is —$COR_9$, $R_3$ is —$COR_{10}$ and $R_9$ and $R_{10}$ are attached to each other to form a ring. $R_9$ and $R_{10}$ are each a nitrogen atom and each nitrogen atom is independently attached to hydrogen, $C_{1-4}$alkyl, or a benzyl group. Other preferred embodiments are delineated in U.S. Pat. Nos. 4,647,576; 4,681,893 and 5,273,995.

Compound V is further preferably (βR,δR)-2-(p-fluorophenyl)-β,δ-dihydroxy-5-isopropyl-3-phenyl-4-(phenylcarbamoyl)pyrrole-1-heptanoic acid) (atorvastatin). The lactone form of atorvastatin is (2R-trans)-5-(4-fluorophenyl)-2-(1-methylethyl)-N,4-diphenyl-1-[2-(tetrahydro-4-hydroxy-6-oxo-2H-pyran-2-yl)ethyl]-1H-pyrrole-3-carboxamide.

In a further embodiment of the invention, compounds V and VI preferably have the following configuration (VII):

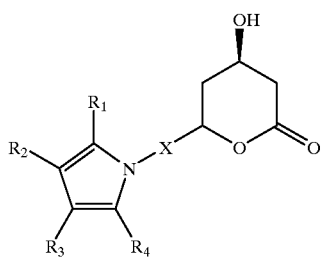

wherein $R_1$, $R_2$, $R_3$ and $R_4$ are as defined for compounds V and VI;

or the corresponding dihydroxy acid having the following configuration (VIII):

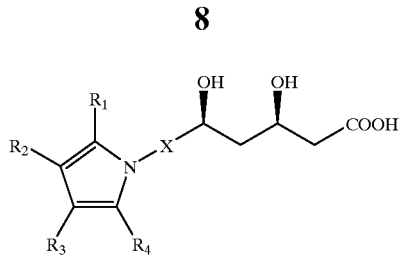

or a pharmaceutically acceptable salt thereof.

In a further embodiment of the invention, compounds V and VI have the following configuration (IX):

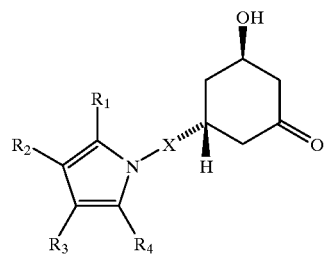

wherein $R_1$, $R_2$, $R_3$ and $R_4$ are as defined for compounds V and VI;

or the corresponding dihydroxy acid having the following configuration (X):

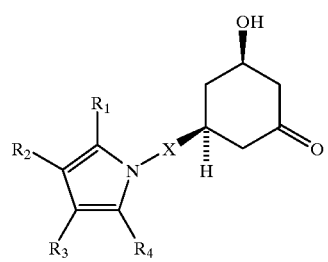

or a pharmaceutically acceptable salt thereof.

The substituted pyrroles may be synthesized by methods known in the art as described in U.S. Pat. Nos. 4,647,576,; 4,681,893; 5,273,995 and as similarly described in Roth, B. D. et al., *J. Med. Chem.* 34:357–366 (1991), all hereby incorporated by reference in their entirety.

The present invention can use any compatible animal food, including dry animal food. The composition of the animal food is not a critical part of the invention, but will depend on the egg-laying animal it will be administered to. Suitable animal foods are readily available commercially. The animal food is preferably an oviparous vertebrate animal food. If the egg-laying animal is a chicken, the composition may typically include, for example, corn and soybean meal (about 66.15% and about 21.29% by weight, respectively). The chicken food may also contain, on a weight percent basis, about 1.75% alfalfa meal, about 1.50% dicalcium carbonate, about 5.38% calcium carbonate, about 2.74% oyster shell, about 0.45% sodium chloride, about 0.25% vitamins and trace minerals, about 1% soybean oil, about 0.06% of a methionine hydroxy analogue (calcium), about 0.1% of an antioxidant and about 0.05% of a mold inhibitor. The vitamin and trace mineral mix may be any such mix as known in the art, such as the mix of DI-Egg (Dawe's Laboratories, Chicago Ill.). Any antioxidant known in the art may be used, such as that sold under the name Dry Polyanox from Agrimerica, Inc., Northbrook, Ill. The mold inhibitor includes typical inhibitors known in the art, such as those purchased from Agrimerica under the name of Dry Mold-Chek Plus 5762. It will be recognized that certain components in the diet may be removed and other components added, depending on the situation. Moreover, it will be recognized that the relative proportions of the compounds in the animal food mixture may be increased or decreased depending on the situation. Animal food compositions for other oviparous vertebrates are well known in the art.

In one aspect of the invention, the method includes administering to an egg-laying animal an amount of a cholesterol-reducing component effective in reducing the amount of cholesterol in an egg. The cholesterol-reducing component is preferably an HMG-CoA reductase inhibitor.

The HMG-CoA reductase inhibitor is typically added to the food of the animal in a quantity that will reduce the level of cholesterol in an egg. The inhibitor is typically included in the food by methods known in the art, including adding the inhibitor directly to the food or to a carrier with subsequent addition of the carrier/inhibitor mixture to the food. For example, the inhibitor may be mixed with a vegetable oil and the vegetable oil/inhibitor mixture may be mixed into the food. As a further example, the inhibitor may be mixed with an organic solvent, the inhibitor/solvent mixture may be mixed with the food and the organic solvent is then allowed to volatilize. The inhibitor will preferably reduce the amount of cholesterol in the yolk of an egg by at least about 5%, 10%, 15%, 20%, 25% and 30% per gram of yolk. The amount of inhibitor will most preferably reduce the amount of cholesterol in the yolk of an egg by at least about 35% per gram of yolk. The amount of inhibitor required to reduce the cholesterol in an egg will vary depending on factors including the potency of the inhibitor, egg size and the rate of biological degradation of the inhibitor. However, the quantity of inhibitor typically administered is in the range of about 5 mg/animal/day to about 265 mg/animal/day, preferably about 15 mg/animal/day to about 150 mg/animal/day, further preferably about 25 mg/animal/day to about 100 mg/animal/day and most preferably about 30 mg/animal/day to about 60 mg/animal/day. The dosage is based on the animal eating about 100 g of food/day. Therefore, to administer about 30 mg/animal/day of the inhibitor, the food must be supplemented with about 0.03% by weight of the inhibitor. The inhibitor may be administered over the entire laying cycle (e.g., about 20 to about 70 weeks of age) and subsequent cycles. Depending on the inhibitor and the dosage of the inhibitor, initial decreases in egg cholesterol may be seen after about 7 to about 42 days after the dose regimen has begun. However, larger daily doses may be required if it is desired to obtain cholesterol reduction in a shorter period of time. It must be recognized that, if the doses are large enough to completely inhibit cholesterol synthesis, steroid hormone production could be impaired which would result in the failure of the animal to lay eggs.

The method is particularly advantageous in lowering the level of cholesterol in chicken eggs. However, the method of reducing the level of cholesterol may be applied to any oviparous vertebrate, including geese, turkey, quail, rattites (including ostriches, emus and rheas), turtles and fish.

Reference will now be made to specific examples using the above described processes. It is to be understood that the examples are provided to more completely describe preferred embodiments, and that no limitation to the scope of the invention is intended thereby. It is to be noted that analysis of variance, as described in Steel, R. G. D. and Torrie, J. H., *Principles and Procedures of Statistics: A Biometrical Approach*, $2^{nd}$ ed. McGraw-Hill, New York, N.Y., 137–171;187–188, 1980, was performed on all data using the General Linear Models procedure of the SAS® Institute as described in *SAS/STAT User's Guide,* Version 6, $4^{th}$ ed., vol. 2, SAS Institute, Inc., Cary, N.C., 891–996, 1989. In certain instances, single degree of freedom linear contrasts were also performed as described in the above Steel and Torrie reference. Individual treatment differences were tested by Duncan multiple range test as described in the above Steel and Torrie reference. Differences at P<0.05 were considered significant. Moreover, the hens initial body weights in the Examples that follow ranged from 1,556 g to 1,646 g (P>0.05) and, during the course of the 5-week study, the birds gained between 67 g and 137 g (data not shown). Feed intakes did not differ (P>0.05) among treatments and ranged from 99–106 g/bird/day (data not shown). Thus, since the HMG-CoA reductase inhibitors were fed at dietary levels of 0.03% or 0.06%, all treated hens consumed approximately 30 or 60 mg of compound/bird/day, respectively. On a body weight basis, this equated to daily doses of approximately 19 or 38 mg HMG-CoA reductase inhibitor/kg body weight.

EXAMPLE 1

Treatment of Hens with HMG-CoA Reductase Inhibitors

Forty, 18-month-old, White Leghorn hens were obtained from the flock maintained at the Purdue University Poultry Research Center. Each hen was placed in an individual 30×35×45 cm slant-back cage in an environmentally controlled room (24° C. and 16 h of light daily) and birds were assigned to one of the seven dietary treatments (see below) on the basis of both egg production and average egg weight during the 10 days immediately prior to the initiation of the experiment. Ten control hens were fed a corn-soybean meal-based layer ration as described in Elkin, R. G., and J. C. Rogler, *J. Agric. Food Chem.* 38:1635–1641, 1990, containing 0.06% avicel® microcrystalline cellulose (FMC Corp., Philadelphia, Pa.) (diet 1) while five hens each were fed the same ration supplemented, at the expense of avicel®, with 0.03% atorvastatin (diet 2), 0.06% atorvastatin (diet 3), 0.03% lovastatin (diet 4), 0.06% lovastatin (diet 5), 0.03% simvastatin (diet 6), or 0.06% simvastatin (diet 7). The two levels of each drug equated to a daily dosage of approximately 30 or 60 mg/hen, respectively, based on a daily feed intake of 100 g/bird. Feed and water were supplied for ad libitum consumption throughout the 35-day experiment, and feed intake, egg production, and egg weights were recorded daily on an individual basis. On day 35, all of the hens were fasted for 15 hours and individual blood samples were obtained by cardiac puncture using heparinized 12-cc syringes with 18 gauge needles. Immediately after procurement of a blood sample, each hen was euthanitized by cervical dislocation. Its entire liver was then removed, weighed, and sectioned in order to provide samples for subsequent biochemical, enzymatic, and Northern blot analyses. In addition, a portion of the left liver lobe was collected from each hen and fixed in 10% buffered formalin. The tissues were embedded in paraffin, sectioned at 5 $\mu$m, stained with hematoxylin and eosin, and examined microscopically by light microscopy. The above protocol was approved by the Purdue University Animal Care and Use Committee.

Atorvastatin was provided by Parke-Davis. The drug was synthesized as described in Roth, et al., *J. Med. Chem.,*

34:357–366, 1991. Lovastatin (Merck, Sharp & Dohme) was prepared by extracting formulated capsules of Mevacor as described in Bocan, *Biochim. Biophys. Acta*, 1123:133–144, 1992, whereas simvastatin was provided by Merck, Sharp & Dohme.

EXAMPLE 2

Effect of HMG-CoA Reductase Inhibitors on Yolk Cholesterol Contents of Eggs

Hens were treated as described in Example 1. One egg from each hen was collected on days 0, 7, 14, 21, 28, and 35. The eggs were hard-cooked, and the yolks were separated, weighed, and crumbled. A 1-g sample of each yolk was homogenized with 15 ml of chloroform-methanol 2:1 (by vol.), sonicated, and filtered as described in Elkin, R. G. and Rogler, J. C., *J. Agric. Food Chem.* 38:1635–1641, 1990. Egg homogenate filtrates were analyzed for cholesterol as described in Rudel, L. L. and Morris, M. D., *J. Lipid Res.* 14:364–366 (1973). The results are shown in Table 1.

vs. 193.1 mg/yolk, respectively). These reductions were maintained throughout the duration of the study such that by week 5, total yolk cholesterol contents of 137.2 mg (0.03% dose) and 107.9 mg (0.06% dose) were observed. The latter figure, a 46% reduction from the control level of 201.5 mg cholesterol/egg (week 5), is of a magnitude never before reported, and was accounted for by a 19% decrease in yolk weight (see Table 2) combined with a 35% reduction in the amount of cholesterol per g of yolk. Simvastatin also depressed yolk cholesterol levels, but to a much lesser degree than atorvastatin. As compared to controls, maximal yolk cholesterol reductions of 20% on a mg/g basis (9.3 vs. 11.6, respectively) and 22% on a per yolk basis (158.0 vs. 201.5, respectively) were observed in hens fed 0.06% simvastatin. Lovastatin was the least efficacious of the three statins, as evidenced by maximal yolk cholesterol reductions of 7% on a mg/g basis (10.8 vs. 11.6, respectively) and 7% on a per yolk basis (186.9 vs. 201.5, respectively) in hens fed the higher dose.

TABLE 1

Yolk cholesterol contents of eggs from control and statin-treated laying hens

| Treatment | % of Diet | Week 0 | Week 1 | Week 2 | Week 3 | Week 4 | Week 5 |
|---|---|---|---|---|---|---|---|
| | | | | mg cholesterol/g yolk | | | |
| Control | — | $11.6 \pm 0.2^a$ | $11.9 \pm 0.1^a$ | $11.5 \pm 0.1^a$ | $11.7 \pm 0.1^a$ | $11.6 \pm 0.1^a$ | $11.6 \pm 0.2^a$ |
| Atorvastatin | 0.03 | $11.4 \pm 0.3^a$ | $9.4 \pm 0.3^c$ | $8.7 \pm 0.2^e$ | $8.6 \pm 0.2^c$ | $8.3 \pm 0.1^d$ | $8.2 \pm 0.2^d$ |
| Atorvastatin | 0.06 | $11.3 \pm 0.3^a$ | $9.3 \pm 0.2^c$ | $7.8 \pm 0.3^f$ | $7.5 \pm 0.1^f$ | $7.5 \pm 0.1^c$ | $7.6 \pm 0.2^d$ |
| Lovastatin | 0.03 | $11.0 \pm 0.2^a$ | $10.7 \pm 0.2^b$ | $11.1 \pm 0.2^{a,b}$ | $10.8 \pm 0.2^b$ | $10.9 \pm 0.2^{a,b}$ | $10.8 \pm 0.1^b$ |
| Lovastatin | 0.06 | $10.9 \pm 0.1^a$ | $10.7 \pm 0.1^b$ | $10.8 \pm 0.1^{b,c}$ | $10.5 \pm 0.1^{b,c}$ | $10.9 \pm 0.2^{a,b}$ | $10.8 \pm 0.1^b$ |
| Simvastatin | 0.03 | $10.8 \pm 0.2^a$ | $11.2 \pm 0.2^{a,b}$ | $10.3 \pm 0.2^{c,d}$ | $10.0 \pm 0.1^{c,d}$ | $10.3 \pm 0.2^{b,c}$ | $10.1 \pm 0.1^b$ |
| Simvastatin | 0.06 | $11.0 \pm 0.3^a$ | $10.7 \pm 0.2^b$ | $10.0 \pm 0.1^d$ | $9.8 \pm 0.1^d$ | $9.9 \pm 0.3^c$ | $9.3 \pm 0.1^c$ |
| | | | | mg cholesterol/yolk | | | |
| Control | | $196.6 \pm 3.6^a$ | $198.3 \pm 4.3^a$ | $193.1 \pm 3.9^a$ | $198.8 \pm 4.3^a$ | $199.7 \pm 3.0^a$ | $201.5 \pm 5.8^a$ |
| Atorvastatin | 0.03 | $203.2 \pm 7.7^a$ | $161.7 \pm 5.5^{b,c}$ | $141.1 \pm 3.3^c$ | $143.7 \pm 3.3^c$ | $134.3 \pm 2.2^c$ | $137.2 \pm 3.8^d$ |
| Atorvastatin | 0.06 | $191.9 \pm 7.3^a$ | $149.7 \pm 3.8^c$ | $105.3 \pm 4.3^d$ | $104.0 \pm 3.7^d$ | $104.2 \pm 2.3^d$ | $107.9 \pm 3.9^e$ |
| Lovastatin | 0.03 | $195.7 \pm 6.8^a$ | $192.2 \pm 6.5^a$ | $193.8 \pm 6.6^a$ | $192.3 \pm 5.1^a$ | $193.9 \pm 4.2^a$ | $193.6 \pm 4.0^{a,b}$ |
| Lovastatin | 0.06 | $197.8 \pm 4.3^a$ | $185.5 \pm 8.4^{a,b}$ | $186.6 \pm 5.3^{a,b}$ | $184.6 \pm 5.1^{a,b}$ | $187.1 \pm 7.2^{a,b}$ | $186.9 \pm 4.3^{a,b}$ |
| Simvastatin | 0.03 | $189.7 \pm 6.1^a$ | $192.9 \pm 5.3^a$ | $174.6 \pm 4.2^{a,b}$ | $166.2 \pm 2.7^b$ | $174.6 \pm 2.7^b$ | $172.1 \pm 2.9^{b,c}$ |
| Simvastatin | 0.06 | $191.1 \pm 7.9^a$ | $188.7 \pm 9.1^{a,b}$ | $170.8 \pm 3.0^b$ | $166.0 \pm 4.6^b$ | $170.4 \pm 7.0^b$ | $158.0 \pm 2.7^{c,d}$ |

Values are mean ± SEM for duplicate analyses of one egg per hen per week from 10 (control) or 5 (vastatin treatments) hens.
$^{a-f}$Within a column, means with different superscripts are significantly different ($P \leq 0.05$).

As seen in Table 1, significant decreases in yolk cholesterol contents vs. controls, on both a per g of yolk and a per yolk (egg) basis, were noted in both atorvastatin-fed groups after only seven days of treatment (9.4 and 9.3 vs. 11.9 mg/g yolk and 161.7 and 149.7 vs. 198.3 mg/yolk, respectively). By week 2, eggs from the low dose and high dose atorvastatin-treated hens contained 27% and 45% less total yolk cholesterol than those of control eggs (141.1 and 105.3

EXAMPLE 3

Effect of HMG-CoA Reductase Inhibitors on Egg Production and Yolk and Egg Weights Hens were treated as described in Example 1. Egg yolk was weighed as outlined in Example 2. The results are shown in Table 2.

TABLE 2

Egg production, egg weights, and yolk weights of control and statin-treated laying hens

| Treatment | % of Diet | Week 1 | Week 2 | Week 3 | Week 4 | Week 5 | Overall |
|---|---|---|---|---|---|---|---|
| | | | | Hen-day egg production, % | | | |
| Control | — | $84.3 \pm 0.9^{b,c,d}$ | $84.3 \pm 0.5^b$ | $88.6 \pm 0.7^a$ | $90.0 \pm 1.3^a$ | $82.9 \pm 1.7^b$ | $85.1 \pm 1.7^a$ (298) |
| Atorvastatin | 0.03 | $82.9 \pm 1.8^{c,d}$ | $68.6 \pm 1.0^c$ | $80.0 \pm 2.0^b$ | $77.1 \pm 1.2^c$ | $77.1 \pm 1.2^{c,d}$ | $75.4 \pm 4.1^{b,c}$ (132) |
| Atorvastatin | 0.06 | $82.9 \pm 1.0^{c,d}$ | $60.0 \pm 1.8^d$ | $68.6 \pm 1.8^c$ | $68.6 \pm 1.8^d$ | $74.3 \pm 1.0^d$ | $69.1 \pm 3.5^c$ (121) |
| Lovastatin | 0.03 | $91.4 \pm 1.2^a$ | $88.6 \pm 1.0^a$ | $85.7 \pm 1.0^a$ | $88.6 \pm 1.8^a$ | $88.6 \pm 1.0^a$ | $88.6 \pm 2.4^a$ (155) |
| Lovastatin | 0.06 | $88.6 \pm 1.0^{a,b}$ | $85.7 \pm 1.5^{a,b}$ | $88.6 \pm 1.0^a$ | $88.6 \pm 1.8^a$ | $91.4 \pm 1.2^a$ | $88.6 \pm 2.9^a$ (155) |

TABLE 2-continued

Egg production, egg weights, and yolk weights of control and statin-treated laying hens

| Treatment | % of Diet | Week 1 | Week 2 | Week 3 | Week 4 | Week 5 | Overall |
|---|---|---|---|---|---|---|---|
| Simvastatin | 0.03 | 80.0 ± 2.5$^d$ | 85.7 ± 1.5$^{a,b}$ | 80.0 ± 1.2$^b$ | 80.0 ± 1.2$^{b,c}$ | 80.0 ± 1.2$^{b,c}$ | 80.6 ± 2.3$^{a,b}$ (141) |
| Simvastatin | 0.06 | 85.7 ± 1.5$^{b,c}$ | 82.9 ± 1.0$^b$ | 77.1 ± 1.2$^b$ | 82.9 ± 1.0$^b$ | 88.6 ± 1.0$^a$ | 82.3 ± 1.9$^{a,b}$ (144) |
| | | | | Egg weight, g | | | |
| Control | — | 64.4 ± 0.5$^a$ | 64.7 ± 0.5$^a$ | 64.3 ± 0.5$^{a,b}$ | 64.9 ± 0.5$^{a,b}$ | 64.7 ± 0.7$^a$ | 64.6 ± 1.1$^a$ (298) |
| Atorvastatin | 0.03 | 63.0 ± 0.7$^a$ | 61.2 ± 0.8$^{c,d}$ | 60.5 ± 0.8$^c$ | 60.3 ± 0.7$^d$ | 61.0 ± 0.7$^b$ | 61.3 ± 1.0$^{a,b}$ (132) |
| Atorvastatin | 0.06 | 63.6 ± 0.8$^a$ | 59.5 ± 1.0$^d$ | 56.9 ± 0.7$^d$ | 56.8 ± 0.7$^c$ | 57.8 ± 0.7$^c$ | 58.9 ± 0.9$^b$ (121) |
| Lovastatin | 0.03 | 64.9 ± 0.7$^a$ | 64.3 ± 0.8$^{a,b}$ | 65.1 ± 0.7$^a$ | 65.8 ± 0.6$^a$ | 64.7 ± 0.7$^a$ | 65.0 ± 1.4$^a$ (155) |
| Lovastatin | 0.06 | 62.6 ± 1.9$^a$ | 64.0 ± 0.7$^{a,b}$ | 65.3 ± 1.1$^a$ | 63.3 ± 0.8$^{b,c}$ | 62.9 ± 0.8$^{a,b}$ | 63.8 ± 1.8$^a$ (155) |
| Simvastatin | 0.03 | 63.8 ± 1.0$^a$ | 63.9 ± 0.9$^{a,b}$ | 62.5 ± 0.7$^{b,c}$ | 62.8 ± 0.7$^{b,c}$ | 62.9 ± 0.7$^{a,b}$ | 63.3 ± 1.4$^{a,b}$ (141) |
| Simvastatin | 0.06 | 63.8 ± 1.0$^a$ | 62.0 ± 1.0$^{b,c}$ | 61.0 ± 1.0$^c$ | 62.2 ± 1.0$^b$ | 60.5 ± 0.8$^b$ | 62.0 ± 1.9$^{a,b}$ (144) |
| | | | | Yolk weight, g | | | |
| Control | — | 16.6 ± 0.4$^a$ | 16.8 ± 0.3$^a$ | 17.0 ± 0.4$^a$ | 17.2 ± 0.3$^{a,b}$ | 17.3 ± 0.4$^a$ | 17.0 ± 0.2$^a$ (50) |
| Atorvastatin | 0.03 | 17.2 ± 0.3$^a$ | 16.2 ± 0.3$^a$ | 16.7 ± 0.4$^a$ | 16.6 ± 0.2$^b$ | 16.6 ± 0.3$^a$ | 16.6 ± 0.1$^a$ (25) |
| Atorvastatin | 0.06 | 16.1 ± 0.3$^a$ | 13.4 ± 0.3$^b$ | 13.9 ± 0.5$^b$ | 13.9 ± 0.3$^c$ | 14.2 ± 0.4$^b$ | 14.3 ± 0.2$^b$ (25) |
| Lovastatin | 0.03 | 17.9 ± 0.7$^a$ | 17.4 ± 0.8$^a$ | 17.8 ± 0.5$^a$ | 17.8 ± 0.4$^a$ | 17.8 ± 0.5$^a$ | 17.7 ± 0.2$^a$ (25) |
| Lovastatin | 0.06 | 17.4 ± 1.0$^a$ | 17.3 ± 0.7$^a$ | 17.7 ± 0.6$^a$ | 17.2 ± 0.9$^{a,b}$ | 17.3 ± 0.7$^a$ | 17.4 ± 0.3$^a$ (25) |
| Simvastatin | 0.03 | 17.2 ± 0.5$^a$ | 17.0 ± 0.3$^a$ | 16.7 ± 0.4$^a$ | 17.0 ± 0.5$^{a,b}$ | 17.1 ± 0.3$^a$ | 17.0 ± 0.2$^a$ (25) |
| Simvastatin | 0.06 | 17.5 ± 0.8$^a$ | 17.2 ± 0.4$^a$ | 16.9 ± 0.5$^a$ | 17.2 ± 0.4$^{a,b}$ | 17.0 ± 0.3$^a$ | 17.2 ± 0.2$^a$ (25) |

Values are mean ± SEM of 10 (control) or 5 (statin treatments) hens. Hen-day egg production was calculated as (100 × number of eggs laid)/(number of hens × days). For the 10 days immediately preceding the commencement of the study, the average hen-day egg production, egg weights, and yolk weights for each treatment group were 86%, 65.0 g, and 17.5 g, respectively. Number of eggs or yolks for each overall mean (weeks 1–5) are in parentheses.
$^{a-d}$Within a column, means with different superscripts are significantly different (P ≤ 0.05).

As seen in Table 2, overall hen-day egg production was significantly depressed only in the atorvastatin-treated groups as compared to that of control birds, with maximal reductions at each level observed by week 2. The rate of lay actually increased thereafter and, by week 5, production rates of the low- and high-dose atorvastatin-treated birds were 93% and 90% that of controls, respectively. Although hens fed either level of atorvastatin or 0.06% simvastatin laid significantly smaller eggs than controls during weeks 2–5, overall egg weights were decreased (P≦0.05) only in the high-dose atorvastatin-treated birds. With regard to the latter group, maximal reductions in egg weights were noted by week 3. Overall yolk weights were also reduced (P≦0.05) only in birds fed 0.06% atorvastatin, with a maximal decrease observed during the second week of the study. Lovastatin treatment did not affect (P>0.05) any of the above production variables.

EXAMPLE 4

Effect of HMG-CoA Reductase Inhibitors on the Diameters and Composition of Plasma VLDL Particles from Laying Hens Plasma VLDL were isolated as described in Elkin, R G., and Schneider, W. J., *Poult. Sci.* 73:1127–1136 (1994), and the lipid composition of plasma VLDL was determined based on the extraction procedure of Slayback et al., *Anal. Biochem.*, 83:372–384 (1977), and the HPLC method of Homan R., and Anderson, M. K., *J. Chromatogr. B.*, 708:21–26, (1998).

In order to determine the VLDL particle size, a carbon-coated formvar grid was initially floated on a drop of each VLDL sample. If the sample was too concentrated, it was diluted (10-or 100-fold) in a buffer containing 0.15 M NaCl, 0.2 mM EDTA, 1 mM PMSF, and 5 $\mu$M leupeptin. After the grid floated on the drop for 5–10 minutes, the grid was removed and excess fluid drawn off with a piece of filter paper. The grid was then touched to 1% aqueous uranyl acetate and the excess stain removed with filter paper. Samples were examined in a JEOL JEM-100CX transmission electron microscope (JEOL, Tokyo, Japan) operating at 80 kV. Three representative micrographs were taken of each sample at a magnification 26,000×. Photographic positives of the negatives were made at an enlargement factor of 2.5× (82,500× final magnification) and the photographs were digitized at 600 dpi on a Hewlett-Packard Scanjet 4C flatbed scanner. Analysis of the digitized images was performed using Optimas 5.2 software (Optimas, Edmunds, Wash.). The feret diameter for a minimum of 500 particles was determined. All microscopic, photographic, and image analysis procedures were conducted without the operator's knowledge of the treatments from which the samples were obtained. The results are shown in Table 3.

TABLE 3

Diameters and compositions of plasma VLDL particles from control and statin-treated laying hens

| Treatment | % of Diet | Diameter nm | EC | UC | TG | PE % | PC | SM | Protein |
|---|---|---|---|---|---|---|---|---|---|
| Control | — | 35.7 ± 0.1$^a$ (692) | 0.14 ± 0.03$^a$ | 3.22 ± 0.13$^a$ | 62.01 ± 1.36$^a$ | 4.27 ± 0.15$^a$ | 11.90 ± 0.32$^b$ | 0.90 ± 0.09$^a$ | 17.56 ± 0.80$^a$ |
| Atorvastatin | 0.03 | 34.9 ± 0.1$^{a,b}$ (838) | 0.03 ± 0.00$^b$ | 2.63 ± 0.26$^a$ | 61.35 ± 1.73$^a$ | 3.98 ± 0.25$^a$ | 14.12 ± 1.09$^a$ | 1.08 ± 0.86$^a$ | 16.80 ± 0.94$^a$ |

TABLE 3-continued

Diameters and compositions of plasma VLDL particles from control and statin-treated laying hens

| Treatment | % of Diet | Diameter nm | EC | UC | TG | PE % | PC | SM | Protein |
|---|---|---|---|---|---|---|---|---|---|
| Atorvastatin | 0.06 | 34.7 ± 0.1[b] (826) | 0.03 ± 0.01[b] | 2.05 ± 0.10[b] | 60.28 ± 2.93[a] | 3.10 ± 0.80[a] | 13.26 ± 0.64[a,b] | 0.00[a] | 21.29 ± 3.49[a] |
| Lovastatin | 0.03 | 35.5 ± 0.1[a,b] (793) | 0.06 ± 0.01[a,b] | 2.94 ± 0.11[a] | 62.78 ± 1.01[a] | 3.76 ± 0.33[a] | 11.99 ± 0.18[b] | 1.08 ± 0.31[a] | 17.37 ± 0.70[a] |
| Lovastatin | 0.06 | 34.8 ± 0.1[a,b] (774) | 0.08 ± 0.02[a,b] | 3.03 ± 0.34[a] | 60.74 ± 1.22[a] | 3.46 ± 0.93[a] | 12.07 ± 0.82[b] | 0.66 ± 0.23[a] | 19.96 ± 1.32[a] |
| Simvastatin | 0.03 | 35.2 ± 0.1[a,b] (755) | 0.06 ± 0.02[a,b] | 2.84 ± 0.20[a] | 61.23 ± 2.98[a] | 3.96 ± 0.17[a] | 12.15 ± 0.58[b] | 1.77 ± 1.24[a] | 17.99 ± 1.48[a] |
| Simvastatin | 0.06 | 35.3 ± 0.1[a,b] (738) | 0.08 ± 0.04[a,b] | 2.97 ± 0.13[a] | 62.03 ± 1.53[a] | 3.65 ± 0.51[a] | 13.85 ± 0.61[a,b] | 0.36 ± 0.23[a] | 17.06 ± 0.84[a] |

Values are mean ± SEM of plasma VLDL particles from 10 (control) or 5 (vastatin treatments) hens. For the particle diameter data, the average number of particles measured per hen per treatment appear in parentheses. Particle composition data are from single analyses of one plasma VLDL sample per hen per diet. EC, esterified cholesterol; UC, unesterified cholesterol; TG, triglyceride; PE, phosphatidylethanolamine; PC, phosphatidylcholine; SM, sphingomyelin.
[a,b]Within a column, means with different superscripts are significantly different ($P \leq 0.05$).

As seen in Table 3, plasma VLDL particle diameters were reduced ($P \leq 0.05$) only in hens fed 0.06% atorvastatin, and the particles were richer in protein and contained 79% and 36% less esterified- and unesterified-cholesterol, respectively, than controls. Although the 0.03% dose of atorvastatin, as well as both doses of lovastatin and simvastatin, also significantly lowered VLDL-esterified cholesterol levels, they did not affect ($P > 0.05$) the relative proportion of unesterified cholesterol, which was the major form of this sterol present in the VLDL particles. Moreover, the relative contents of triglyceride, phosphatidylethanolamine, sphingomyelin, and protein were not significantly affected by any of the vastatins. In contrast, phosphatidylcholine was elevated ($P \leq 0.05$) only in VLDL particles from hens fed 0.03% atorvastatin.

EXAMPLE 5

Effect of HMG-CoA Reductase Inhibitors on the Weight, Cholesterol Content, Histology and Enzyme Activity of Livers from Inhibitor-Treated Hens The birds were treated and samples were prepared as described in Example 1. One gram of each liver sample was homogenized with 12 ml of chloroform-methanol 2:1 (by vol.) and filtered directly into a 50 ml volumetric flask using a glass microfiber filter. Following re-homogenization and re-filtration, the liver filtrates were diluted to a final volume of 50 ml with chloroform-methanol 2:1 (by vol.) and analyzed for cholesterol content by the method of Rudel and Morris described in Example 2. The results are shown in Table 4 below.

TABLE 4

Weights and cholesterol contents of livers from control and statin-treated laying hens

| Treatment | % of Diet | Liver Weight | | Cholesterol | |
|---|---|---|---|---|---|
| | | g | g/100 g BW | mg/g liver | mg/liver |
| Control | — | 26.4 ± 0.9[c] | 1.61 ± 0.06[b] | 3.4 ± 0.04[a] | 88.7 ± 2.4[a] |
| Atorvastatin | 0.03 | 30.9 ± 1.2[b] | 1.82 ± 0.05[a,b] | 2.8 ± 0.05[c] | 87.4 ± 2.2[a] |
| Atorvastatin | 0.06 | 35.3 ± 2.3[a] | 2.02 ± 0.09[a] | 2.5 ± 0.07[d] | 89.7 ± 5.2[a] |
| Lovastatin | 0.03 | 31.4 ± 1.4[b] | 1.81 ± 0.09[a,b] | 3.0 ± 0.05[b,c] | 95.7 ± 3.3[a] |
| Lovastatin | 0.06 | 28.8 ± 0.9[b,c] | 1.76 ± 0.05[b] | 3.1 ± 0.07[b] | 90.2 ± 3.6[a] |
| Simvastatin | 0.03 | 28.0 ± 1.7[b,c] | 1.65 ± 0.07[b] | 3.1 ± 0.10[b] | 86.8 ± 2.9[a] |
| Simvastatin | 0.06 | 28.1 ± 0.6[b,c] | 1.64 ± 0.04[b] | 2.9 ± 0.04[b,c] | 82.6 ± 1.9[a] |

Values are mean ± SEM of 10 (control) or 5 (statin treatments) hens. Cholesterol data are from duplicate analyses of one tissue sample per hen.
[a–c]Within a column, means with different superscripts are significantly different ($P \leq 0.05$).

As seen in Table 4, absolute liver weights were increased in all of the HMGR inhibitor-fed birds; however, when expressed on a relative body weight basis, only the organs of birds fed 0.06% atorvastatin were significantly larger than controls. Light microscopic examination of the livers of all hens in the study revealed no evidence of necrosis, fatty change, or inflammation (data not shown). In addition, no differences between experimental groups were noted.

Table 4 also shows that, although all of the HMGR inhibitor-treated groups had significantly lower cholesterol contents on a per g of tissue basis, liver total cholesterol values were unaffected ($P > 0.05$) by dietary treatment when expressed on a whole organ basis.

In order to determine enzyme activities, liver microsomes were isolated by ultracentrifugation as described in Junker, L. H. and Story, J. A., *Lipids* 20:712–718, 1985 and stored in liquid nitrogen until use. Microsomal HMG-CoA reductase activity was determined by measuring the conversion of $^{14}$C-HMG-CoA to $^{14}$C-mevalonate as described in Shapiro, D. J., et al., *Biochim. Biophys. Acta* 370:369–377 (1974), while microsomal cholesterol 7α-hydroxylase activity was determined by measuring the incorporation of phospholipid liposome-solubilized $^{14}$C-cholesterol into $^{14}$C-7α-hydroxycholesterol as described in Junker, L. H. and Story, J. A., *Lipids* 20:712–718 (1985).

Figure 2:
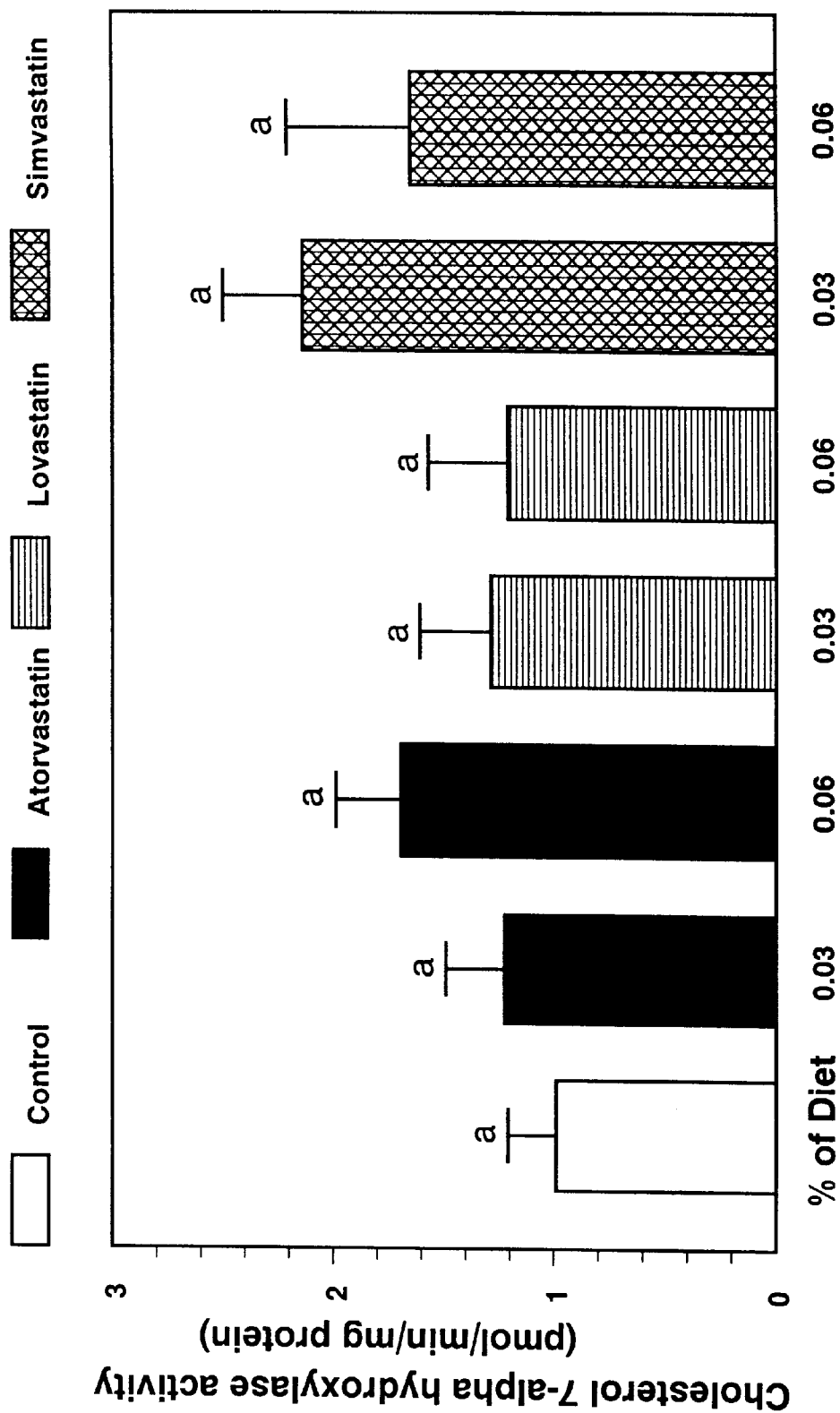
FIG. 2 is a graph showing hepatic microsomal cholesterol 7α-hydroxylase activity in control (n=10) and statin-treated (n=5) laying hens on day 35 of the study. Values are mean±SD. Bars with similar letters are not significantly different (P>0.05).

FIG. 1 shows that microsomal HMG-CoA reductase activities were significantly elevated 2- to 3-fold in the livers of all statin-fed animals vs. controls, while FIG. 2 shows that none of the HMG-CoA reductase inhibitors had a significant effect on hepatic microsomal cholesterol 7α-hydroxylase activity.

EXAMPLE 6

Effect of HMG-CoA Reductase Inhibitors on Liver mRNA Expression

The hens were treated and samples were prepared as described in Example 1. Northern Blotting was performed to determine the effects of the HMG-CoA reductase inhibitors on the abundance of liver HMG-CoA mRNA as well as that of three other genes whose products play a key role in the hepatic synthesis of VLDL: apoB and the two components of the heterodimeric microsomal triglyceride transfer protein (MTP; ie., the large subunit and protein disulfide isomerase). Approximately 1 g of liver from each hen was homogenized in guanidinium thiocyanate solution (4M guanidinium thiocyanate, 25 mM sodium citrate [pH 7.4], 0.5% sarcosyl, and 0.1M β-mercaptoethanol) and total RNA extracted according as described in Chomczynski, P., and Sacchi, N., *Anal. Biochem.* 162:156–159 (1987). Total RNA (20 μg) was separated by electrophoresis on either a 0.8% or a 1% agarose gel according to Sambrook et al., *Molecular Cloning*, 2$^{nd}$ ed., Cold Spring Harbor Laboratory Press, Plainview, N.Y., 1.12 (1989) as modified by Tsang et al., *Biotechniques* 14:380–381 (1993). The integrity of the 28S and 18S rRNA was verified after staining with ethidium bromide and the gel was washed twice for 15 minutes in 1M ammonium acetate and transferred to a Genescreen membrane by capillary action. RNA cross-linking, prehybridization, hybridization, and wash steps were performed as described by Donkin et al., *J. Molec. Endocrinol.* 16:151–158 (1996). The abundance of target RNA was visualized on Kodak X-Omat AR film (Eastman Kodak Co., Rochester, N.Y.). Membranes were reprobed following stripping in 0.1×SSC and 1% SDS at 100° C. for 1 hour. Variations in loading and transfer of RNA were determnined using cDNA for rat 18S rRNA as described in Donkin et al., *J. Molec. Endocrinol.* 16:151–158 (1996).

The plasmid ChMTP, a full-length cDNA clone for the large subunit of chicken microsomal triglyceride transfer protein (MTP), was a gift from Dr. David A. Gordon (Department of Metabolic Diseases, Bristol-Myers Squibb, Princeton, N.J.). The 2.9 kb fragment cDNA was cloned into the BamHI/BamHi site of plasmid pcDNA-3.0 (Invitrogen, Carlsbad, Calif.). The plasmid CB13-1, a 960 bp fragment encoding the N-terminal part of chicken protein disulfide isomerase (PDI) described in Parkkonen et al., *Biochem J.* 256:1005–1011 (1988), was cloned into the EcoR1 site of pBR322 as described by Sambrook et al., *Molecular Cloning*, 2$^{nd}$ ed., Cold Spring Harbor Laboratory Press, Plainview, N.Y., 1.12 (1989), and was obtained from Dr. Erwin Ivessa (Department of Molecular Genetics, University of Vienna, Vienna, Austria). The plasmid HMGR #23, a 650 bp fragment containing the catalytic domain of chicken HMGR, was cloned into the NcoI and Pst 1 sites of the pGEM-T vector (Promega Corp., Madison, Wis.) and was provided by Dr. Elke Hengstschläger-Ottnad (Department of Molecular Genetics, University of Vienna, Vienna, Austria). The plasmid pB2, a 1.2 kb fragment encoding part of the C-terminal portion of chicken apoB described in Kirchgessner, T. G., *Gene* 59:241–251 (1987), was cloned into the EcoRV sites of the pBluescript KS- vector (Stratagene, La Jolla, Calif.) and obtained from Dr. Madeline Douaire (Laboratoire de Génétique, Institut National de la Recherche Agronornique, Rennes Cedex, France). The plasmid pDF 8 containing a 1.1 kb BaniHI-EcoRI fragment corresponding to the central region of the rat 18S rRNA gene was kindly provided by Dr. Richard Torzynski (Cytoclonal Pharmaceuticals, Dallas, Tex.). This clone reacts with 18S rRNA from a number of species, including chicken, cow, and pig (S. S. Donkin, unpublished).

Insert cDNA was excised from the plasmids by restriction enzyme digestion, separated by electrophoresis through low melting temperature agarose, and purified by lithium chloride precipitation as describe in Favre, D. *Biotechniques* 13:24 (1992). DNA probes were labeled with $^{32}$P-labeled dCTP using the Ready-to-Go™ random oligonucleotide priming kit (Pharmacia Biotech, Inc., Piscataway, N.J.) to a specific activity of approximately $10^9$ cpm/μg DNA.

Figure 3:
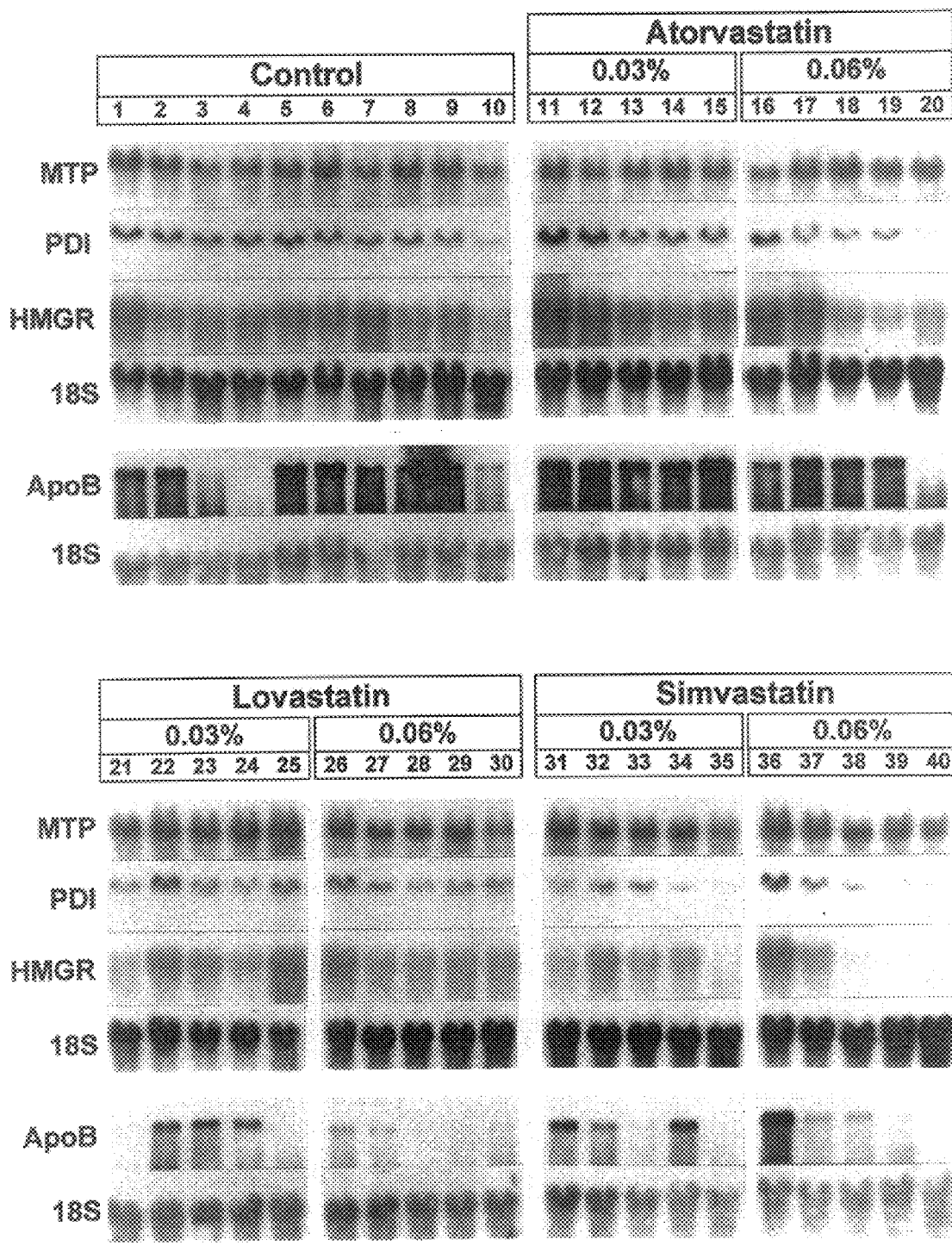
FIG. 3 represents a northern blot analysis of hepatic microsomal triglyceride transport protein (MTP) large subunit, protein disulfide isomerase (PDI), HMG-CoA reductase (HMGR), and apolipoprotein B (apoB) mRNA in control (numbers 1–10) and statin-treated (numbers 11–40) laying hens. Each lane contained 20 µg total RNA. Differences in loading and/or RNA transfer are accounted for by hybridization with an 18S cDNA. Approximate sizes of the mRNAs were: MTP, 1.4 kb; PDI, 2.7 kb; HMGR, 4.0 kb; apoB, 14 kb; and 18S, 1.8 kb. Because of the large size of the apoB mRNA, total RNA was separated on an additional agarose gel (0.8%), transferred, and probed, whereas MTP, PDI, and HMGR signals were visualized by sequential probing and stripping of the same membrane replica of a 1% agarose gel.

In contrast to the more uniform responses in liver cholesterol content and microsomal HMGR activity among animals within each treatment group, there was considerable variation among individuals with regard to hepatic HMGR mRNA abundance as seen in FIG. 3 (in particular, note 0.03% atorvastatin-fed animals 11 and 12 vs. 13–15, 0.06% atorvastatin-fed animals 16 and 17 vs. 18–20, 0.03% lovastatin-fed animals 25 vs. 21, and 0.06% simvastatin-fed animals 36 vs. 38–40). Even more striking was the within- and between-treatment variability in the apoB and PDI mRNA levels, while MTP large subunit mRNA abundance appeared to be unaffected by statin treatment.

Figure 4:
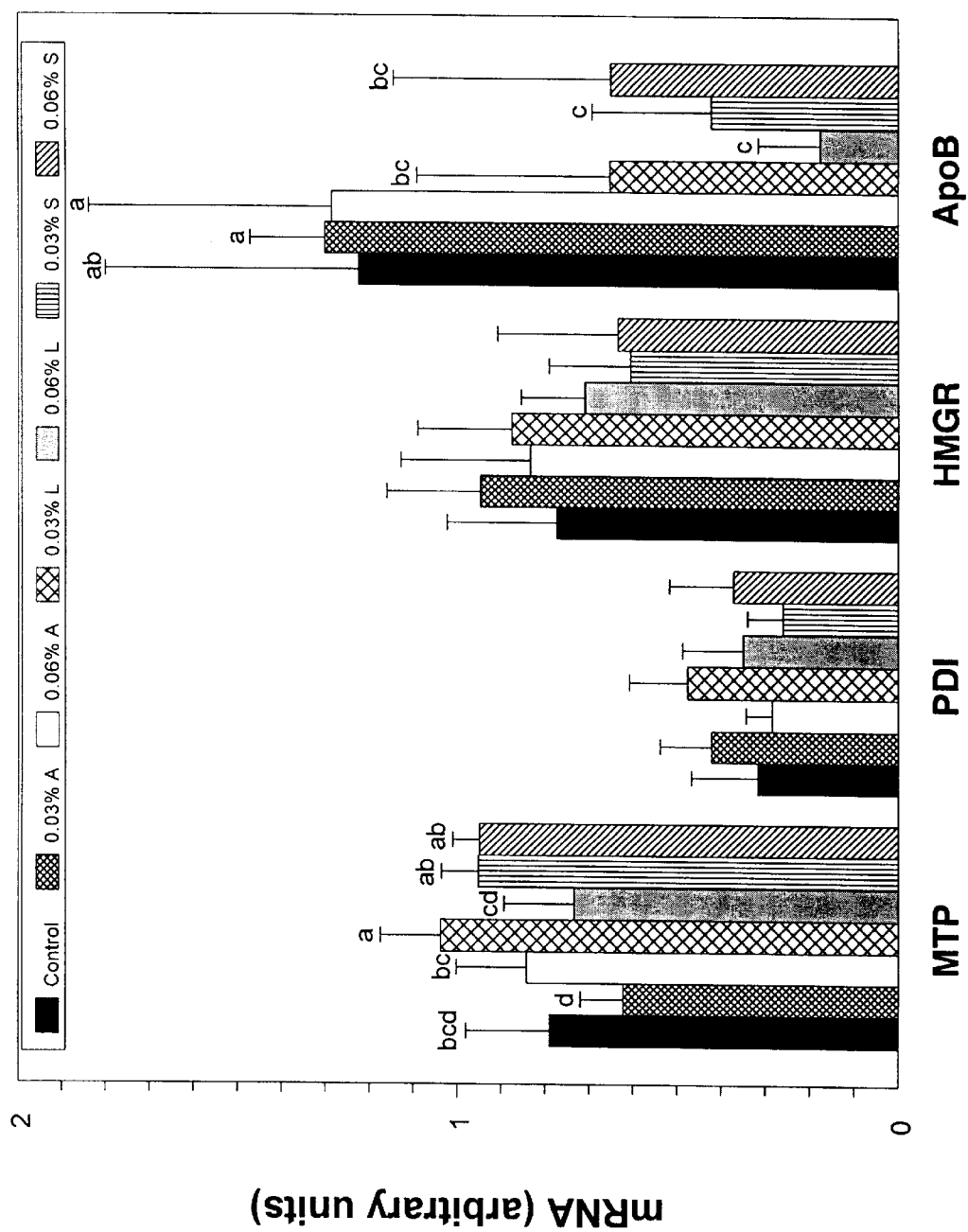
FIG. 4 is a graph showing the comparative effects of atorvastatin (A), lovastatin (L), and simvastatin (S) on hepatic microsomal triglyceride transport protein (MTP) large subunit, protein disulfide isomerase (PDI), HMG-CoA reductase (HMGR), and apolipoprotein B (apoB) mRNA. The individual autoradiographs depicted in FIG. 3 used to create FIG. 4 were digitally scanned (Epson Model ES-1200C scanner) and the signals were quantitated using SigmaGel (Version 1.0; Jandel Scientific, San Rafael, Calif.) and normalized by the abundance of 18S rRNA on each membrane. Values are mean±SD (n=10 for controls; 5 for each statin group). For the MTP and apoB transcripts, bars with similar letters are not significantly different (P>0.05).

However, when the signals were normalized by the abundance of 18S rRNA, significant differences among dietary treatments were observed only for hepatic MTP and apoB mRNA as seen in FIG. 4. Single degree of freedom linear contrasts revealed the following differences (P≦0.05) for MTP large subunit: simvastatin>control, simvastatin>atorvastatin, and lovastatin>atorvastatin; and for apoB: control>lovastatin, control>simvastatin, atorvastatin>lovastatin, and atorvastatin>simvastatin.

EXAMPLE 7

Effect of HMG-CoA Reductase Inhibitors on Plasma Lipids and Yolk Protein Profiles Plasma samples obtained as described in Example 1 were analyzed for total cholesterol content according to the method of Rudel and Morris described in Example 2. Free glycerol-corrected total plasma triglyceride concentrations were determined using a commercial kit (Triglycerides-GB, Boehringer Mannheim Diagnostics, Indianapolis, Ind.).

Figure 5:
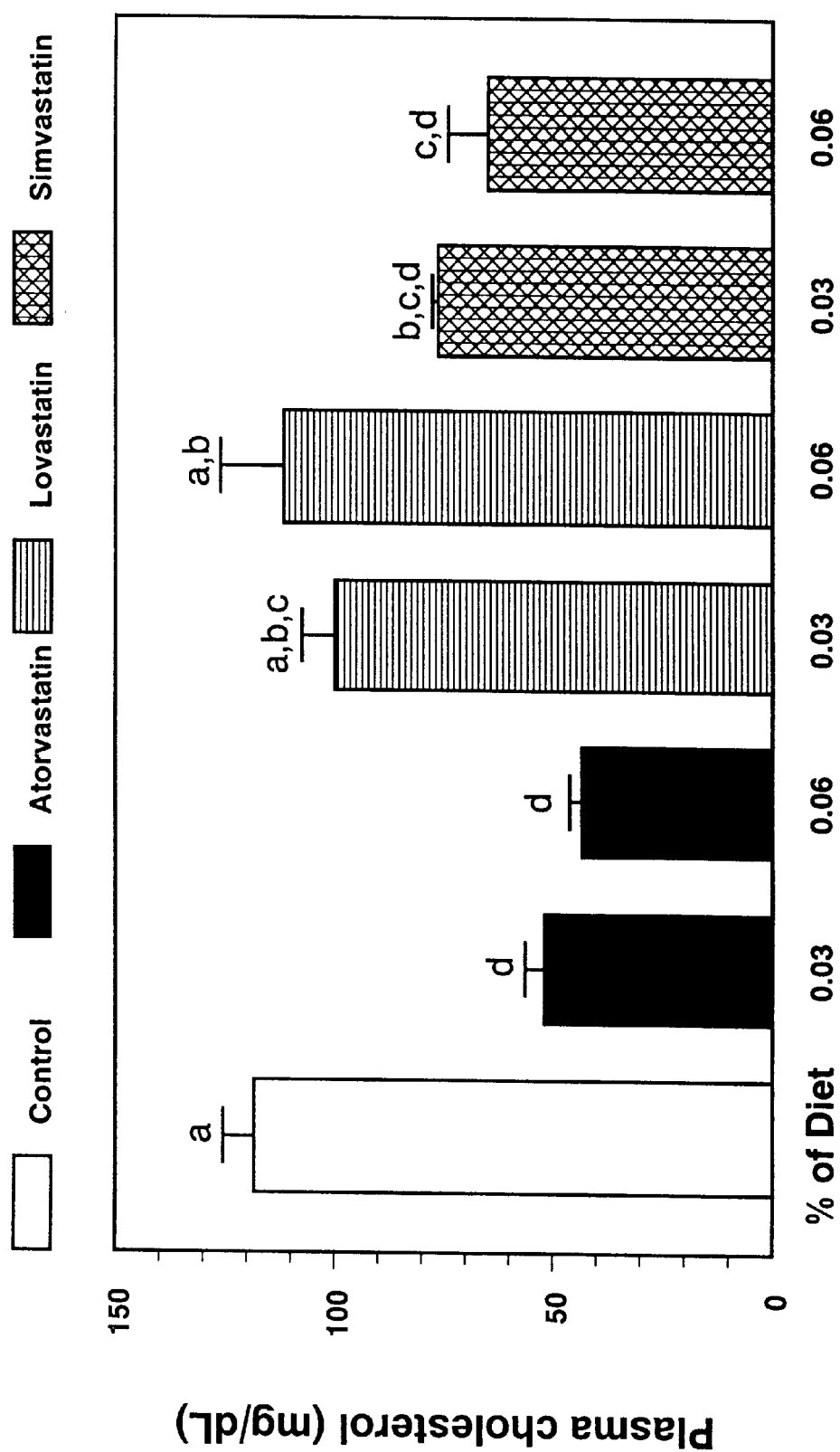
FIG. 5 depicts a graph showing plasma total cholesterol concentrations of control (n=10) and HMG-CoA reductase inhibitor-treated (n=5) laying hens. Birds were fasted for 15 hours prior to blood collection on day 35 of the study. Values are mean±SD. Bars with similar letters are not significantly different (P>0.05).
Figure 6:
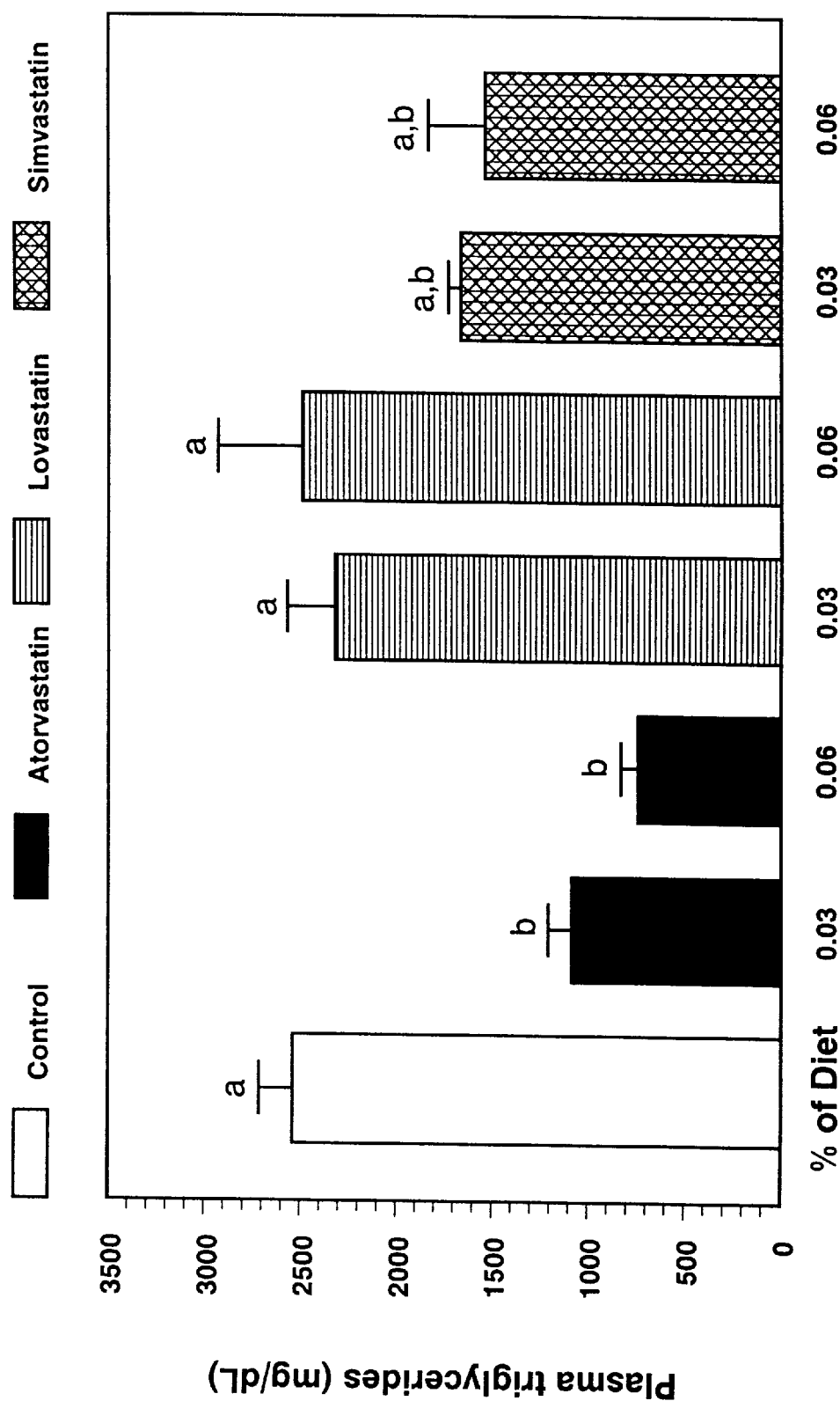
FIG. 6 is a graph showing plasma triglyceride concentrations (glycerol-corrected) of control (n=10) and HMG-CoA reductase inhibitor-treated (n=5) laying hens. Values are mean±SD. Birds were fasted for 15 hours prior to blood collection on day 35 of the study. Bars with similar letters are not significantly different (P>0.05).

FIG. 5 shows that plasma total cholesterol concentrations were lowered (P≦0.05) by both the 0.03% and 0.06% doses of atorvastatin (−56%, −63%) and simvastatin (−36%, −45%), while plasma triglycerides, as seen in FIG. 6 were depressed (P≦0.05) only with atorvastatin (−57%, −71%). Lovastatin did not significantly affect any of the plasma lipid variables.

In order to determine the yolk protein profiles, one fresh egg was collected from each hen on day 35 of the experiment. The yolk was carefully separated from the albumen using an egg separator and any adhering albumen was removed by rolling the yolk on a moist paper towel. The yolk membrane was then punctured with a forceps, and the yolk was gently squeezed out into a graduated cylinder and mixed with 5 vol of an ice-cold solution containing 20 mM Tris, 150 mM NaCl, 0.2 mM EDTA, 1 mM PMSF, and 5 μM leupeptin. Yolk protein contents were measured in the presence of 0.37% sodium dodecyl sulfate (SDS) based on the method of Lowry et al., *J. Biol. Chem.*, 193:265–275 (1951), as modified by Elkin, R. G. and Schneider, W. J., *Poult. Sci.* 73:1127–1136 (1994). Egg yolk extracts were subjected to SDS-polyacrylamide gel electrophoresis (PAGE) on 4.5%–18% gradient gels under reducing conditions as described in the 1994 Elkin and Schneider, reference above. Following electrophoresis, the gels were stained with Coomassie Brilliant Blue R-250 containing 20 mM $AlCl_3$, in order to visualize the phosvitin bands as described in Elkin, R. G., et al., *Comp. Biochem. Physiol.*, 112B:191–196 (1995).

Figure 7:
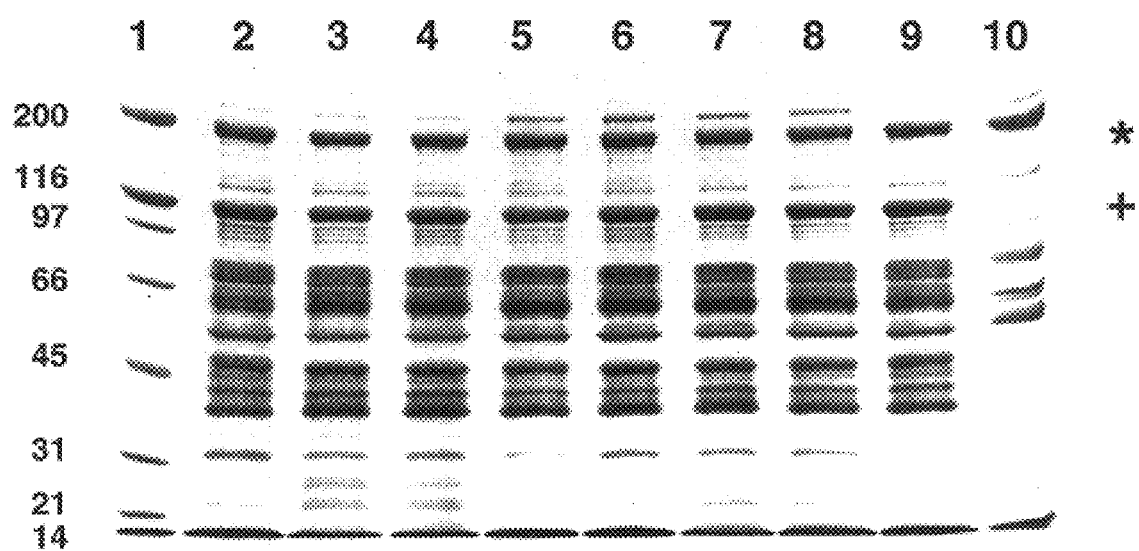
FIG. 7 depicts a sodium dodecyl sulfate (SDS) polyacrylamide gel (4.5–18% gradient gel) with whole yolk extracts from control hens and HMG-CoA reductase inhibitor-treated hens. Lane 1 contained protein standards (molecular weights [kDa] are indicated); lanes 2 and 9 contained yolk extracts from control hens; lanes 3 to 8 contained yolk extracts from hens fed 0.03% atorvastatin, 0.06% atorvastatin, 0.03% lovastatin, 0.06% lovastatin, 0.03% simvastatin, and 0.06% simvastatin, respectively. Lane 10 contained yolk VLDL. Each lane contained 12 µg of protein. The gel was stained with Coomassie Brilliant Blue R-250 containing 20 mM $AlCl_3$ in order to visualize the phosvitin bands (~37–45 kDa). The position of the largest VLDL apolipoprotein B fragment is indicated by an asterisk, while the position of lipovitellin I, the largest major vitellogenin (VTG) fragment, is indicated by a plus sign. For a complete description of all bands present in whole egg yolk, see Elkin et al., *Comp. Biochem. Physiol.* 112B:191–196 (1995).

Representative yolk protein profiles of eggs from the statin-fed birds are shown in FIG. 7 (lanes 3–8) and appeared to be very similar to those of control hens (FIG. 7, lanes 2 and 9). This suggested that the proportion of VLDL relative to VTG, the other major yolk protein precursor, was not selectively reduced by HMGR inhibitor treatment of the hens.

While the invention has been illustrated and described in detail in the foregoing description, the same is to be considered as illustrative and not restrictive in character, it being understood that only the preferred embodiment has been described and that all changes and modifications that come within the spirit of the invention are desired to be protected.

What is claimed is:

1. An animal feed composition effective in reducing the amount of cholesterol in an egg, comprising an oviparous vertebrate animal food and a cholesterol-reducing component selected from the group consisting of:

a. a compound of the formula:

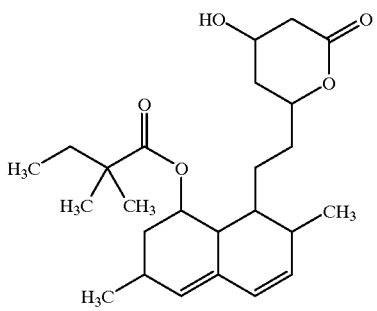

b. the corresponding dihydroxy acid of the formula:

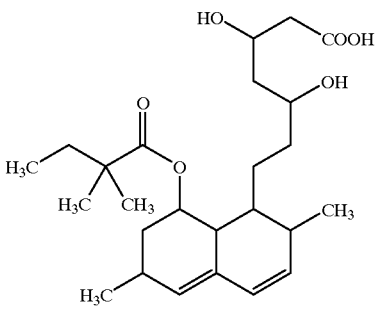

and;
   c. a pharmaceutically acceptable salt of said dihydroxy acid.

2. The animal feed composition of claim 1, which is a bird feed.
3. The animal feed composition of claim 2, wherein said bird feed is chicken feed.
4. The animal feed composition of claim 1, wherein said cholesterol-reducing component is included in an amount effective to reduce the amount of cholesterol in said egg by at least about 10% per gram of yolk.
5. A method of reducing the amount of cholesterol in an egg, comprising administering to an egg-laying animal an amount of a cholesterol-reducing component effective in reducing the amount of cholesterol in said egg by at least about 10% per gram of yolk, said cholesterol-reducing component selected from the group consisting of:

a. a compound of the formula:

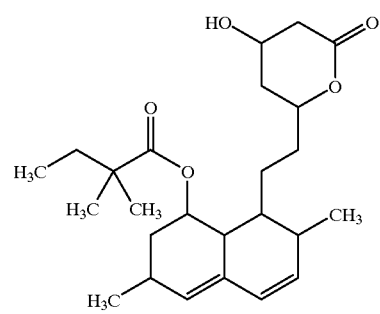

b. the corresponding dihydroxy acid of the formula:

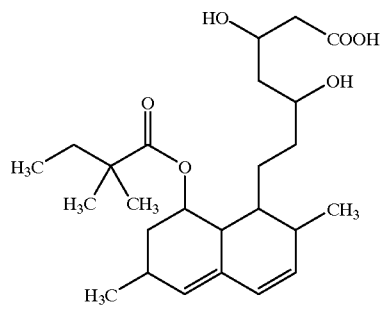

and;
   c. a pharmaceutically acceptable salt of said dihydroxy acid.

6. The method of claim 5, wherein said egg-laying animal is a bird.
7. The method of claim 6, wherein said bird is a chicken.
8. The method of claim 5, wherein said amount of cholesterol-reducing component is effective in reducing the amount of cholesterol in said egg by at least about 20% per gram of yolk.
9. The method of claim 5, wherein said component is administered orally to said egg-laying animal.
10. The method of claim 5, wherein said effective amount of said cholesterol-reducing component is about 15 mg/animal/day to about 150 mg/animal/day.
11. The method of claim 10, wherein said effective amount of said cholesterol-reducing component is about 30 mg/animal/day to about 60 mg/animal/day.
12. The method of claim 5, wherein said method includes adding said component to feed of the egg-laying animal and administering said feed to said egg-laying animal.

* * * * *

UNITED STATES PATENT AND TRADEMARK OFFICE
CERTIFICATE OF CORRECTION

PATENT NO. : 6,177,121 B1
DATED : January 23, 2001
INVENTOR(S) : Robert G. Elkin and Zhihong Yan It is certified that error appears in the above-identified patent and that said Letters Patent is hereby corrected as shown below:

Column 4,
Line 54, please insert -- wherein -- before "$R_1$".

Column 10,
Line 11, please change "P<0.05" to -- $P \leq 0.05$ --.
Line 12, please change "hens" to -- hens' --.

Column 12, TABLE 1,
Line 6, please change "$7.5 \pm 0.1^c$" to -- $7.5 \pm 0.1^e$ --.
Line 13, please change "$134.3 \pm 2.2^c$" to -- $134.4 \pm 2.2^c$ --.
Line 20, please change "$(P \leqq 0.05)$" to -- $(P \leq 0.05)$ --.

Column 13, TABLE 2,
Line 9, please change "$56.8 \pm 0.7^c$" to -- $56.8 \pm 0.7^e$ --.
Line 13, please change "$62.2 \pm 1.0^b$" to -- $62.2 \pm 1.0^{c,d}$ --.
Line 26, please change "$(P \leqq 0.05)$" to -- $(P \leq 0.05)$ --.

Column 13,
Line 38, please change "$(P \leqq 0.05)$" to -- $(P \leq 0.05)$ --.
Line 42, please change "$(P \leqq 0.05)$" to -- $(P \leq 0.05)$ --.

Column 15, TABLE 3,
Last line, please change "$(P \leqq 0.05)$" to -- $(P \leq 0.05)$ --.

Column 15,
Line 23, please change "$(P \leqq 0.05)$" to -- $(P \leq 0.05)$ --.
Line 53, please change "$(P \leqq 0.05)$" to -- $(P \leq 0.05)$ --.

UNITED STATES PATENT AND TRADEMARK OFFICE
CERTIFICATE OF CORRECTION

PATENT NO.    : 6,177,121 B1
DATED         : January 23, 2001
INVENTOR(S)   : Robert G. Elkin and Zhihong Yan It is certified that error appears in the above-identified patent and that said Letters Patent is hereby corrected as shown below:

<u>Column 18,</u>
Line 6, please change "Agronornique" to -- Agronomique --.
Line 7, please change "BaniHI" to -- BamHI --.
Line 38, please change "($P \leqq 0.05$)" to -- ($P \leq 0.05$) --.
Line 55, please change "($P \leqq 0.05$)" to -- ($P \leq 0.05$) --.
Line 58, please change "($P \leqq 0.05$)" to -- ($P \leq 0.05$) --.

Signed and Sealed this

Twenty-sixth Day of March, 2002

Attest:

Attesting Officer

JAMES E. ROGAN
*Director of the United States Patent and Trademark Office*